(12) United States Patent
Whittle et al.

(10) Patent No.: US 11,286,798 B2
(45) Date of Patent: Mar. 29, 2022

(54) AIRFOIL ASSEMBLY WITH CERAMIC MATRIX COMPOSITE PARTS AND LOAD-TRANSFER FEATURES

(71) Applicants: Rolls-Royce plc, London (GB); Rolls-Royce Corporation, Indianapolis, IN (US); Rolls-Royce North American Technologies Inc., Indianapolis, IN (US)

(72) Inventors: Michael J. Whittle, London (GB); Daniel K. Vetters, Indianapolis, IN (US); Ted J. Freeman, Danville, IN (US); Eric Koenig, Fishers, IN (US); Jeff Crutchfield, Indianapolis, IN (US); Jeffrey A. Walston, Indianapolis, IN (US); David J. Thomas, Brownsburg, IN (US)

(73) Assignees: Rolls-Royce Corporation, Indianapolis, IN (US); Rolls-Royce North American Technologies Inc., Indianapolis, IN (US); Rolls-Royce plc

( * ) Notice: Subject to any disclaimer, the term of this patent is extended or adjusted under 35 U.S.C. 154(b) by 214 days.

(21) Appl. No.: 16/545,791

(22) Filed: Aug. 20, 2019

(65) Prior Publication Data
US 2021/0062663 A1    Mar. 4, 2021

(51) Int. Cl.
*F01D 9/04*    (2006.01)
*F01D 25/00*    (2006.01)

(52) U.S. Cl.
CPC ........... *F01D 9/042* (2013.01); *F01D 25/005* (2013.01); *F05D 2220/32* (2013.01); *F05D 2240/12* (2013.01); *F05D 2300/20* (2013.01)

(58) Field of Classification Search
CPC .... F01D 9/042; F01D 25/005; F05D 2220/32; F05D 2240/12; F05D 2300/20
See application file for complete search history.

(56) References Cited

U.S. PATENT DOCUMENTS

| | | | | |
|---|---|---|---|---|
| 2,914,300 A | * | 11/1959 | Sayre | F01D 9/042 415/135 |
| 3,836,282 A | * | 9/1974 | Mandelbaum | F01D 9/042 415/209.4 |
| 3,857,649 A | * | 12/1974 | Schaller | F01D 25/005 415/200 |
| 4,076,451 A | * | 2/1978 | Jankot | F01D 5/284 415/200 |
| 4,790,721 A | * | 12/1988 | Morris | F01D 5/187 416/241 B |
| 5,078,576 A | * | 1/1992 | Hayton | F01D 5/3084 415/209.3 |
| 5,083,900 A | * | 1/1992 | Carletti | F01D 9/042 415/209.3 |

(Continued)

*Primary Examiner* — Jesse S Bogue
(74) *Attorney, Agent, or Firm* — Barnes & Thornburg LLP

(57) ABSTRACT

An airfoil assembly includes a vane that includes an outer platform, an inner platform, and an airfoil. The outer platform defines an outer boundary of a gas path. The inner platform is spaced apart axially from the outer platform relative to an axis and defines an inner boundary of the gas path. The airfoil extends axially between and interconnects the outer platform and the inner platform. Force loads caused by gases interacting with the airfoil are configured to be transmitted from the airfoil assembly to a case arranged around the airfoil assembly.

20 Claims, 6 Drawing Sheets

(56) References Cited

U.S. PATENT DOCUMENTS

| | | | | |
|---|---|---|---|---|
| 5,411,370 | A | * | 5/1995 | Varsik .................... F01D 25/04 |
| | | | | 415/209.4 |
| 6,045,310 | A | | 4/2000 | Miller et al. |
| 6,514,046 | B1 | | 2/2003 | Morrison et al. |
| 6,648,597 | B1 | * | 11/2003 | Widrig .................. C04B 37/001 |
| | | | | 415/200 |
| 6,884,030 | B2 | | 4/2005 | Darkins, Jr. et al. |
| 7,452,189 | B2 | | 11/2008 | Shi et al. |
| 7,824,152 | B2 | * | 11/2010 | Morrison ................ F01D 9/042 |
| | | | | 415/135 |
| 8,251,652 | B2 | * | 8/2012 | Campbell ............... F01D 9/041 |
| | | | | 415/209.3 |
| 8,256,088 | B2 | * | 9/2012 | James .................... F01D 9/044 |
| | | | | 29/447 |
| 8,292,580 | B2 | * | 10/2012 | Schiavo .................. F01D 5/189 |
| | | | | 416/96 A |
| 9,546,557 | B2 | | 1/2017 | Grooms, III et al. |
| 9,915,159 | B2 | | 3/2018 | Huizenga et al. |
| 10,066,495 | B2 | * | 9/2018 | Roberts ................ F01D 25/246 |
| 10,094,239 | B2 | | 10/2018 | Freeman et al. |
| 10,273,818 | B2 | | 4/2019 | Vetters et al. |
| 10,392,951 | B2 | * | 8/2019 | Carr ....................... F01D 9/042 |
| 2005/0254942 | A1 | * | 11/2005 | Morrison ............. C04B 37/005 |
| | | | | 415/200 |
| 2010/0021290 | A1 | | 1/2010 | Schaff et al. |
| 2016/0123163 | A1 | | 5/2016 | Freeman et al. |
| 2016/0290147 | A1 | | 10/2016 | Weaver |
| 2017/0022833 | A1 | | 1/2017 | Heitman et al. |
| 2017/0298748 | A1 | * | 10/2017 | Vetters ................ F01D 25/005 |

\* cited by examiner

AIRFOIL ASSEMBLY WITH CERAMIC MATRIX COMPOSITE PARTS AND LOAD-TRANSFER FEATURES

FIELD OF THE DISCLOSURE

The present disclosure relates generally to airfoil assemblies for gas turbine engines, and more specifically to airfoils that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength limitations of composite materials.

SUMMARY

The present disclosure may comprise one or more of the following features and combinations thereof.

An airfoil assembly for a gas turbine engine may include a ceramic matrix composite vane, a metallic support spar, and a metallic sleeve. The ceramic matrix composite vane may be adapted to interact with hot gases flowing through a gas path of the gas turbine engine during use of the airfoil assembly. The metallic support spar may extend axially through an interior cavity formed in the ceramic matrix composite vane. The metallic sleeve may be configured to receive force loads applied to the ceramic matrix composite vane by the hot gases during use of the airfoil assembly.

In some embodiments, the ceramic matrix composite vane may include an outer platform, an inner platform, an airfoil, and an outer vane mount. The outer platform may define an outer boundary of the gas path. The inner platform may be spaced apart axially from the outer platform relative to an axis to define an inner boundary of the gas path. The airfoil may extend axially between and interconnect the outer platform and the inner platform. The outer vane mount may extend axially outward away from the outer platform. In some embodiments, the metallic sleeve may be located axially outward of the outer platform outside of the gas path.

In some embodiments, the metallic sleeve may include a sleeve body and a first load-transfer tab. The metallic sleeve may be arranged around the outer vane mount of the ceramic matrix composite vane and the metallic support spar. The first load-transfer tab may extend from the sleeve body toward the outer vane mount of the ceramic matrix composite vane and engage the outer vane mount to transmit the force loads from the ceramic matrix composite vane to the metallic sleeve.

In some embodiments, the outer vane mount includes an inner surface and an outer surface. The inner surface may define a portion of the interior cavity. The outer surface may be opposite the inner surface. In some embodiments, the first load-transfer tab may be engaged with the outer surface of the outer vane mount.

In some embodiments, the ceramic matrix composite vane may have a leading edge, a trailing edge, a pressure side, and a suction side. In some embodiments, the first load-transfer tab may be engaged with the outer surface of the outer vane mount on the suction side of the ceramic matrix composite vane.

In some embodiments, the metallic sleeve may further include a second load-transfer tab. The second load-transfer tab may be configured to engage the outer surface of the outer vane mount on the pressure side of the ceramic matrix composite vane.

In some embodiments, the airfoil assembly may further include a bias member. The bias member may be configured to urge the outer vane mount and the metallic sleeve toward each other on the suction side of the ceramic matrix composite vane. In some embodiments, the bias member may be located in the interior cavity between the outer vane mount and the metallic sleeve on the pressure side of the ceramic matrix composite vane.

In some embodiments, the bias member may include a clip. The clip may receive a portion of the outer vane mount and a portion of the metallic sleeve in the clip. In some embodiments, the clip may be located on the suction side of the ceramic matrix composite vane.

In some embodiments, the bias member may include a clip. The clip may be fixed with the metallic sleeve on the suction side of the metallic sleeve. In some embodiments, the clip may receive an axial terminating end of the outer vane mount.

In some embodiments, the airfoil assembly may further include a fastener. The fastener may extend into the outer vane mount and at least one of the sleeve body and the metallic support spar to engage the outer vane mount with the first load-transfer tab.

According to another aspect of the disclosure, an airfoil assembly may include a vane and a sleeve. The vane may include an outer platform, an inner platform, an airfoil, and an outer vane mount. The inner platform may be spaced apart axially from the outer platform relative to an axis. The airfoil may extend axially between and interconnect the outer platform and the inner platform. The outer vane mount may extend axially outward away from the outer platform. The sleeve may include a sleeve body arranged around the outer vane mount of the vane and a load-transfer tab that engages the outer vane mount.

In some embodiments, the outer vane mount may include an inner surface and an outer surface. The inner surface may define a portion of an interior cavity that extends axially into the vane. The outer surface may be opposite the inner surface.

In some embodiments, the load-transfer tab may be engaged with the outer surface of the outer vane mount. In some embodiments, the load-transfer tab may be engaged with the inner surface of the outer vane mount.

In some embodiments, the airfoil assembly may further include a bias member. The bias member may be located in the interior cavity between the outer vane mount and the sleeve.

In some embodiments, the vane may have a leading edge, a trailing edge, a pressure side, and a suction side. In some embodiments, the load-transfer tab may be engaged with the outer vane mount on the suction side of the vane.

In some embodiments, the airfoil assembly may further include a bias member. The bias member may be configured to urge the outer vane mount and the sleeve toward each other.

In some embodiments, the vane may have a leading edge, a trailing edge, a pressure side, and a suction side. In some embodiments, the bias member may be located between the outer vane mount and the sleeve on the pressure side of the vane.

In some embodiments, the bias member may include a clip. The clip may receive a portion of the outer vane mount and a portion of the sleeve in the clip.

In some embodiments, the bias member may include a clip. The clip may be fixed with the sleeve on the suction side of the sleeve. The clip may receive an axial terminating end of the outer vane mount.

According to another aspect of the disclosure, a method may include providing a vane and a sleeve. The vane may include an outer platform, an inner platform spaced apart axially from the outer platform relative to an axis, an airfoil that extends axially between and interconnects the outer platform and the inner platform, and an outer vane mount that extends axially outward away from the outer platform. The sleeve may include a sleeve body and a load-transfer tab that extends away from the sleeve body.

The method may further include arranging the sleeve around the outer vane mount to locate the sleeve axially outward of the outer platform, engaging the outer vane mount with the load-transfer tab of the sleeve. In some embodiments, and biasing the outer vane mount and the load-transfer tab toward one another. In some embodiments, the load-transfer tab may be located on a suction side of the vane.

These and other features of the present disclosure will become more apparent from the following description of the illustrative embodiments.

DETAILED DESCRIPTION OF THE DRAWINGS

Figure 1:
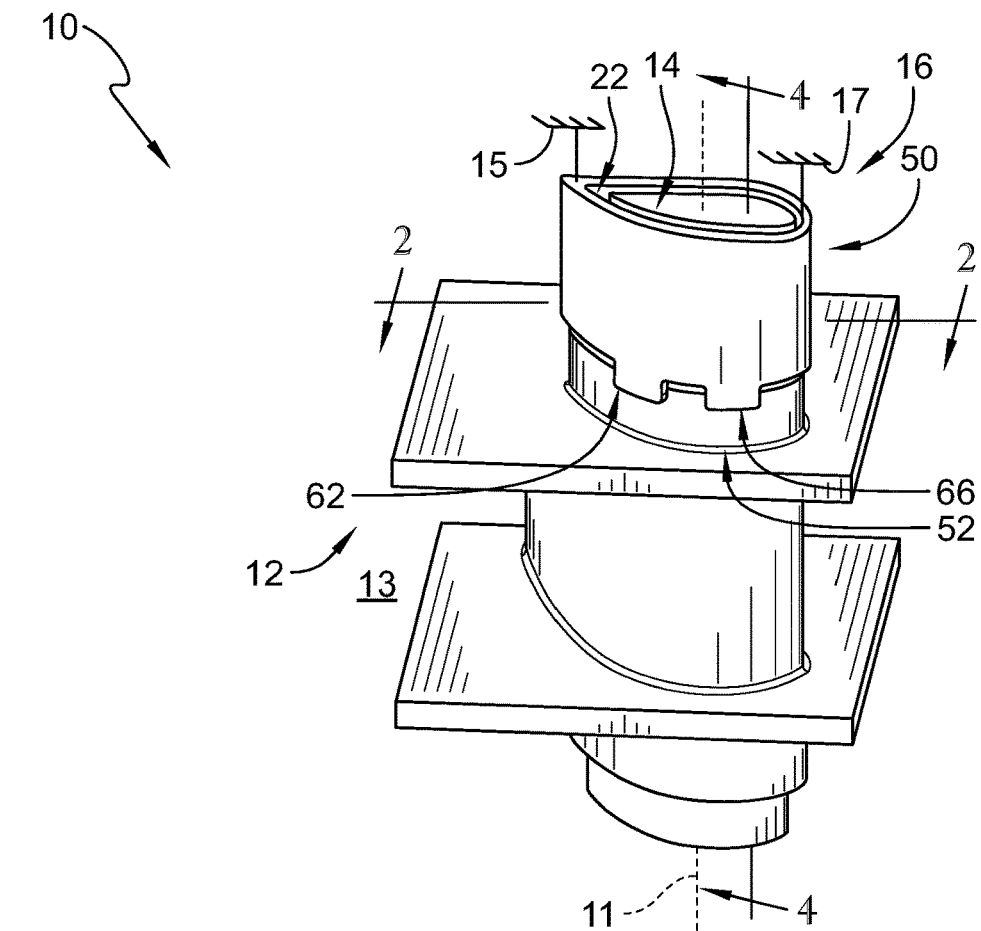
FIG. 1 is a perspective view of an airfoil assembly for a gas turbine engine that includes a ceramic matrix composite vane adapted to interact with hot gases flowing through a gas path of the gas turbine engine, a metallic support spar that extends axially through an interior cavity formed in the vane, and a metallic sleeve that engages the vane to receive force loads applied to the vane by the hot gases during use of the airfoil assembly.

For the purposes of promoting an understanding of the principles of the disclosure, reference will now be made to a number of illustrative embodiments illustrated in the drawings and specific language will be used to describe the same.

Figure 2:
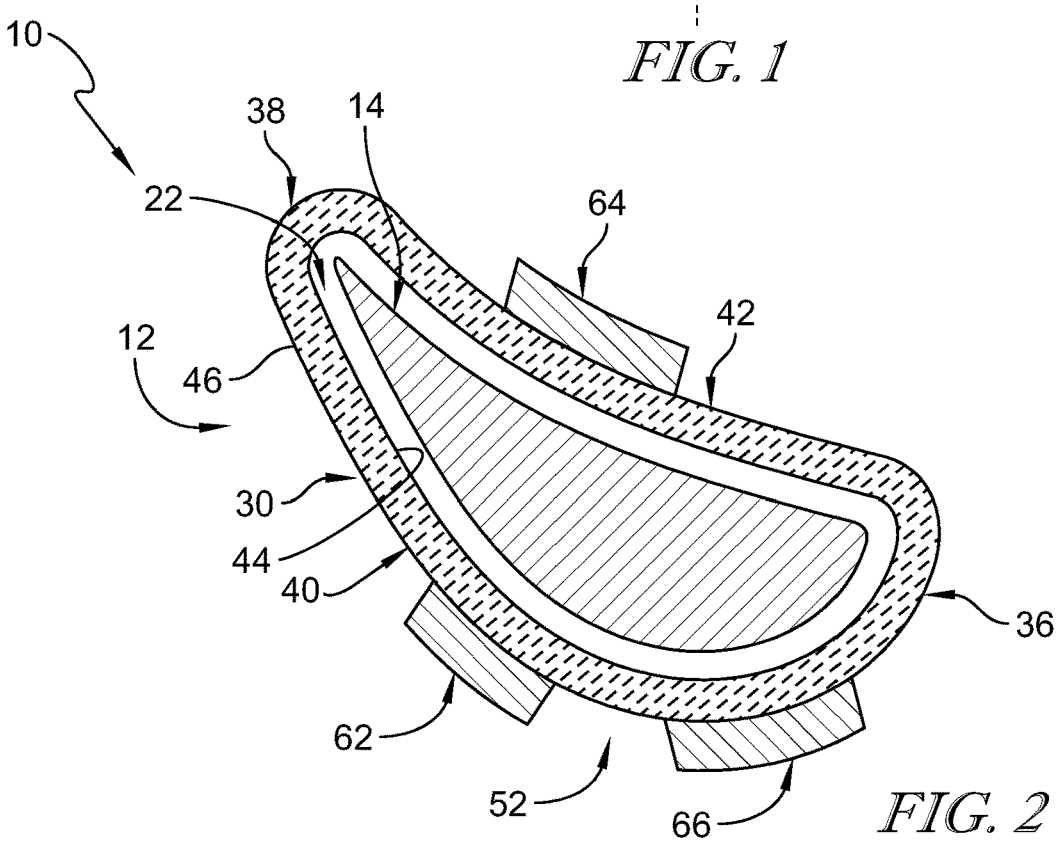
FIG. 2 is a cross-sectional view of the airfoil assembly of FIG. 1 taken along line 2-2 showing that an outer vane mount included in the vane includes an inner surface that defines a portion of the interior cavity and an outer surface opposite the inner surface, and further showing load-transfer tabs included in the metallic sleeve engage the outer surface of the outer vane mount.

An airfoil assembly 10 according to the present disclosure and adapted for use in a gas turbine engine is shown in FIG. 1. The airfoil assembly 10 includes a vane 12, a support spar 14, and a sleeve 16 as shown in FIGS. 1 and 2. The vane 12 is adapted to interact with hot gases flowing through a gas path 13 of the gas turbine engine during use of the airfoil assembly 10. The support spar 14 extends axially through an interior cavity 22 formed in the vane 12. The sleeve 16 is configured to receive force loads applied to the vane 12 by the hot gases at a location outside of the gas path 13 during use of the airfoil assembly 10. The radiation loading of heat onto the features may be lower outside of the gas path 13 as opposed to load-transfer features located axially aligned with the gas path 13.

The vane 12 comprises ceramic matrix materials while the support spar 14 and sleeve 16 comprise metallic materials in the illustrative embodiment. The ceramic matrix composite vane 12 is adapted to withstand high temperatures, but may have relatively low strength compared to the metallic support spar 14. The metallic support spar 14 provides structural strength to the assembly 10 by receiving the force loads applied to the other components of the gas turbine engine. However, the metallic support spar 14 may not be capable of withstanding the high temperatures experienced by the ceramic matrix composite vane 12. As such, the metallic support spar 14 may have a coefficient of thermal expansion greater than that of the ceramic vane 12.

Due to the difference in coefficients of thermal expansion and structural strength between the ceramic matrix composite materials of the vane 12 and the metallic materials of the support spar 14, transferring loading of the vane 12 to the support spar 14 may be difficult. The sleeve 16 is configured to receive the force loads applied to the vane 12, while controlling the orientation of the vane 12 relative to the support spar 14 to define a determinate load transfer from the vane 12 to the sleeve 16 out through the supporting structure. In some embodiments, the supporting structure may be an outer mount support 15 or a turbine case 17 of the gas turbine engine as suggested in FIG. 1.

Figure 3:
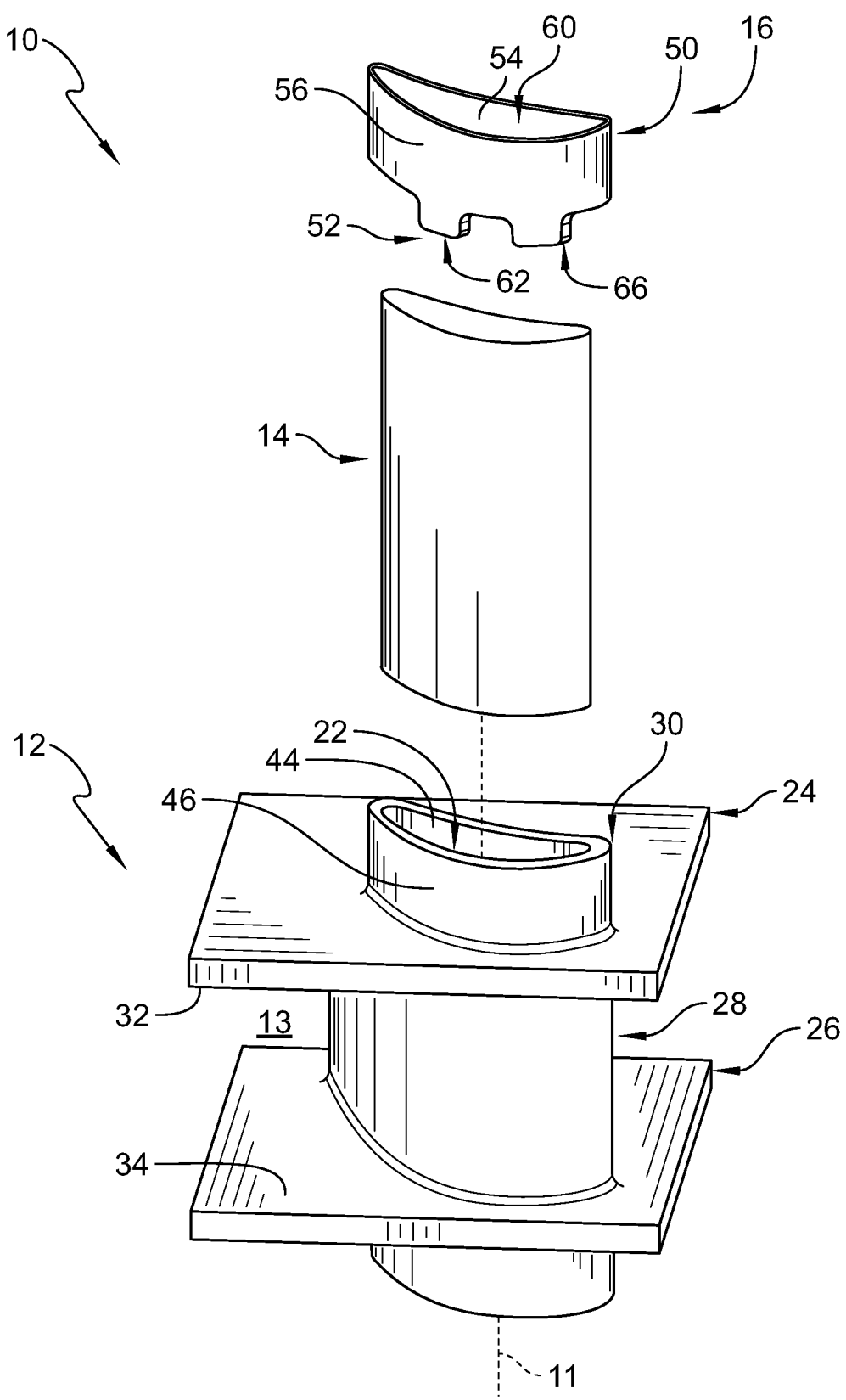
FIG. 3 is an exploded view of the airfoil assembly of FIG. 1 showing the metallic sleeve and the support spar are separate components that are assembled together with the vane to form the airfoil assembly.

The ceramic matrix composite vane 12 includes an outer platform 24, an inner platform 26, an airfoil 28, and an outer vane mount 30 as shown in FIG. 3. The outer platform 24 defines an outer boundary 32 of the gas path 13. The inner platform 26 is spaced apart axially from the outer platform 24 relative to an axis 11 to define an inner boundary 34 of the gas path 13. The airfoil 28 extends axially between and interconnects the outer platform 24 and the inner platform 26. The outer vane mount 30 extends axially outward away from the outer platform 24. The vane 12 further includes an inner extension that extends axially away from the inner platform 26.

Illustratively, the outer platform 24, the inner platform 26, the airfoil 28, and the outer vane mount 30 are integrally formed to provide a single-piece, unitary component. In other embodiments, the vane 12 may be formed from a number of separate components. In other embodiments, the vane 12 may comprise metal, composite, ceramic, or ceramic matrix composite materials.

The vane 12 also has a leading edge 36, a trailing edge 38, a suction side 40, and pressure side 42 as shown in FIG. 2. The trailing edge 38 is spaced radially apart from the leading edge 36 of the vane 12. The pressure side 42 is circumferentially spaced apart from the suction side 40. The suction side 40 and pressure side 42 extend between and interconnect the leading edge 36 and the trailing edge 38. The metallic sleeve 16 is located axially outward of the outer platform 24 outside of the gas path 13 and extends around the leading edge 36, the trailing edge 38, the suction side 40, and the pressure side 42.

The outer vane mount 30 includes an inner surface 44 and an outer surface 46 as shown in FIGS. 2 and 3. The inner surface 44 defines a portion of the interior cavity 22. The outer surface 46 is opposite the inner surface 44 and the metallic sleeve 16 engages the outer surface 46 of the outer vane mount 30 to transfer force loads from the vane 12.

The metallic sleeve 16 includes a sleeve body 50 and load-transfer tabs 52 as shown in FIGS. 1-3. The sleeve body 50 is arranged around the outer vane mount 30 of the ceramic matrix composite vane 12 and the metallic support spar 14. The load-transfer tabs 52 extend axially inward from the sleeve body 50 toward the outer vane mount 30 and engage the outer vane mount 30 at a location outside of the gas path 13. The load-transfer tabs 52 transmit the force loads from the ceramic matrix composite vane 12 to the metallic sleeve 16. Each of the load-transfer tabs 52 is spaced apart from another circumferentially relative to the axis 11.

The sleeve body 50 includes an inner sleeve surface 54 and an outer sleeve surface 56 as shown in FIG. 3. The inner sleeve surface 54 defines a vane mount cavity 60 that receives a portion of the outer vane mount 30. The outer sleeve surface 56 is opposite the inner sleeve surface 54. In the illustrative embodiment, the vane mount cavity 60 is sized to receive both the outer vane mount 30 and the metallic support spar 14.

The load-transfer tabs 52 include at least two load-transfer tabs 62, 64 as shown in FIG. 1-3. The first load-transfer tab 62 is engaged with the outer surface 46 of the outer vane mount 30 on the suction side 40 of the vane 12. The second load-transfer tab 64 is engagable with the outer surface 46 of the outer vane mount 30 on the pressure side 42 of the vane 12.

In the illustrative embodiment, the load-transfer tabs 52 include at least three load-transfer tabs 62, 64, 66. The first and third load-transfer tabs 62, 66 are engaged with the outer surface 46 of the outer vane mount 30 on the suction side 40 of the vane 12, while the second load-transfer tab 64 is engaged with the pressure side 42 of the vane 12. In other embodiments, the load-transfer tabs 52 may include more than three load-transfer tabs 52.

During use of the airfoil assembly 10, the force loads acting on the vane 12 from the hot gases apply a force against the pressure side 42 of the airfoil 28. The force against the pressure side 42 urges the vane 12 toward and into engagement with the load-transfer tabs 62, 66 located on the suction side 40. The load-transfer tabs 62, 66 limit the amount of movement the vane 12 may experience and receive the force loads acting on the vane 12. The load-transfer tabs 62, 66 transmit the loads to the turbine case 17 or mount features 15. In the illustrative embodiment, the load-transfer tabs 52 engage with the outer surface 46 of the outer vane mount 30 to receive the force loads from the vane 12. In other embodiments, the load-transfer tabs 52 may engage with the inner surface 44 of the outer vane mount 30 to receive the force loads from the vane 12.

In the illustrative embodiment, the second load-transfer tab 64 is configured to act as a retention feature that may help control the orientation of the vane 12 during off-loading conditions or surge of the engine. In some embodiments, the second load-transfer tab 64 may not engage the outer surface 46 of the outer vane mount 30 during use of the airfoil assembly 10.

In the illustrative embodiment, the metallic sleeve 16 is configured to be coupled to the outer mount support 15 as suggested in FIG. 1. The outer mount support 15 couples the airfoil assembly 10 to the outer casing 17 of the gas turbine engine. In some embodiments, the outer mount support 15 may be a carrier with hooks/rails that engage the casing 17. In other embodiments, the metallic sleeve 16 may be directly coupled to the casing 17.

Turning again to the metallic support spar 14, the metallic support spar 14 may be coupled to an inner stage seal of the gas turbine engine. The support spar 14 may be configured to transfer axial loads from the inner stage seal axially outwards to the casing 17.

Figure 4:
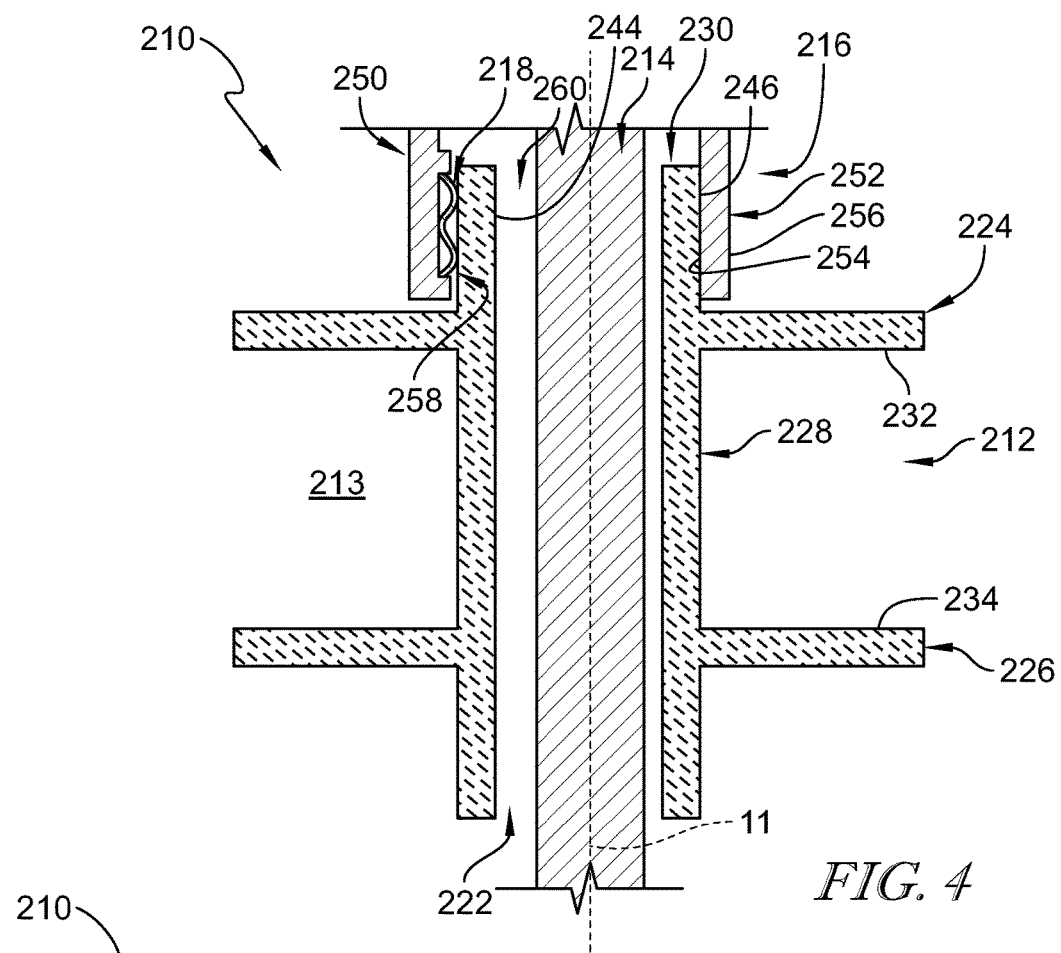
FIG. 4 is a cross-sectional view of another embodiment of the airfoil assembly of FIG. 1 showing the airfoil assembly includes a ceramic matrix composite vane, a metallic support spar that that extends axially through the vane, a metallic sleeve configured to receive force loads applied to the vane by the hot gases during use of the airfoil assembly, and a bias member configured to urge the sleeve and a portion of the vane toward each other and into engagement.
Figures 5, 6:
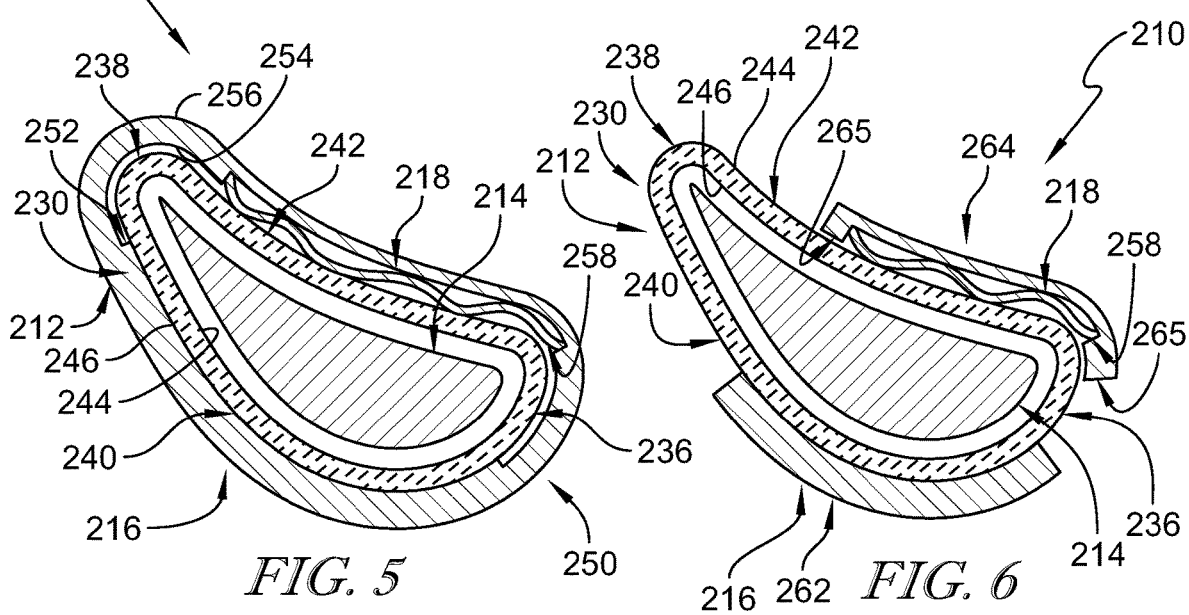
FIG. 5 is a cross-sectional view of the airfoil assembly of FIG. 4 showing the sleeve includes a sleeve body that extends around the vane and a load-transfer tab that engages with a suction side of the vane, and further showing the bias member is arranged between a pressure side of the vane and the sleeve to bias the load-transfer tab of the sleeve into engagement with the suction side of the vane.
FIG. 6 is a cross-sectional view similar to the airfoil assembly of FIG. 5 showing a sleeve that includes a first load-transfer tab that is engaged with the outer surface of the vane on the suction side of the vane and a second load-transfer tab that extends around a portion of the vane on the pressure side of the vane, and further showing the second load-transfer tab is shaped to include a locating notch that receives the bias member.

Another embodiment of an airfoil assembly 210 in accordance with the present disclosure is shown in FIGS. 4-6. The airfoil assembly 210 is substantially similar to the airfoil assembly 10 shown in FIGS. 1-4 and described herein. Accordingly, similar reference numbers in the 200 series indicate features that are common between the airfoil assembly 10 and the airfoil assembly 210. The description of the airfoil assembly 10 is incorporated by reference to apply to the airfoil assembly 210, except in instances when it conflicts with the specific description and the drawings of the airfoil assembly 210.

The airfoil assembly 210 includes a ceramic matrix composite vane 212, a metallic support spar 214, a metallic sleeve 216, and a bias member 218 as shown in FIGS. 4-6. The ceramic matrix composite vane 212 is adapted to interact with hot gases flowing through a gas path 213 of the gas turbine engine during use of the airfoil assembly 210. The metallic support spar 214 extends axially through an interior cavity 222 formed in the ceramic matrix composite vane 212. The metallic sleeve 216 is configured to receive force loads applied to the ceramic matrix composite vane 212 by the hot gases during use of the airfoil assembly 210. The bias member 218 is configured to urge the metallic sleeve 216 and a portion of the vane 212 toward each other to maintain the transferring of force loads from the vane 212 to the metallic sleeve 216.

The ceramic matrix composite vane 212 includes an outer platform 224, an inner platform 226, an airfoil 228, and an outer vane mount 230 as shown in FIG. 4. The outer platform 224 defines an outer boundary 232 of the gas path 213. The inner platform 226 is spaced apart axially from the outer platform 224 relative to the axis 11 to define an inner boundary 234 of the gas path 213. The airfoil 228 extends axially between and interconnects the outer platform 224 and the inner platform 226. The outer vane mount 230 extends axially outward away from the outer platform 224.

The vane 212 further includes a leading edge 236, a trailing edge 238, a suction side 240, and pressure side 242 as shown in FIGS. 5 and 6. The trailing edge 238 is spaced radially apart from the leading edge 236 of the vane 212. The pressure side 242 is circumferentially spaced apart from the suction side 240. The suction side 240 and pressure side 242 extend between and interconnect the leading edge 236 and the trailing edge 238. The metallic sleeve 216 is located axially outward of the outer platform 224 outside of the gas path 213 and extends around the leading edge 236, the trailing edge 238, the suction side 240, and the pressure side 242.

The outer vane mount 230 includes an inner surface 244 and an outer surface 246 as shown in FIGS. 4-6. The inner surface 244 defines a portion of the interior cavity 222. The outer surface 246 is opposite the inner surface 244 and the sleeve 216 engages with the outer surface 246 of the outer vane mount 230.

The metallic sleeve 216 includes a sleeve body 250 and a load-transfer tab 252 as shown in FIGS. 4-6. The sleeve body 250 is arranged around the outer vane mount 230 of the ceramic matrix composite vane 212 and the metallic support spar 214. The load-transfer tab 252 extends from the sleeve body 250 toward the outer vane mount 230 and engages the outer vane mount 230 to transmit the force loads from the ceramic matrix composite vane 212 to the metallic sleeve 216.

The sleeve body 250 includes an inner sleeve surface 254 and an outer sleeve surface 256 as shown in FIGS. 4 and 5. The inner sleeve surface 254 defines a vane mount cavity 260 that receives a portion of the outer vane mount 230. The outer sleeve surface 256 is opposite the inner sleeve surface 254. In the illustrative embodiment, the vane mount cavity 260 is sized to receive both the outer vane mount 230 and the metallic support spar 214.

The inner sleeve surface 254 is also shaped to define a bias member locating notch 258 as shown in FIGS. 4 and 5. The locating notch 258 extends into the inner sleeve surface 254 of the sleeve body 250 and opens toward the pressure side 242 of the vane 212. The locating notch 258 is configured to receive the bias member 218 and maintain the position of the bias member 218 relative to the outer vane mount 230 and the metallic sleeve 216.

In the illustrative embodiment, the load-transfer tab 252 extends from the inner sleeve surface 254 and engages the outer surface 246 of the outer vane mount 230. The load-transfer tab 252 is a continuous rail that extends from the inner sleeve surface 254 and engages the outer surface 246 of the vane 212 along the suction side 240 of the vane 212. In some embodiments, the metallic sleeve 216 may include a plurality of load-transfer tabs 252 that engage the outer surface 246 of the outer vane mount 230 along the suction side 240 of the vane 212.

In some embodiments, the metallic sleeve 216 includes at least two load-transfer tabs 262, 264 as shown in FIG. 6. The first and second load-transfer tabs 262, 264 extend axially inward from the sleeve body 250. The first load-transfer tab 262 is engaged with the outer surface 246 of the outer vane mount 230 on the suction side 240 of the vane 212. The second load-transfer tab 264 extends around a portion of the outer surface 246 of the outer vane mount 230 on the pressure side 242 of the vane 212.

In the illustrative embodiment of FIG. 6, the second load-transfer tab 264 is shaped to include the bias member locating notch 258. The locating notch 258 extends into the second load-transfer tab 264 and opens toward the pressure side 242 of the outer vane mount 230 to receive the bias member 218.

In both illustrative embodiments of FIGS. 5 and 6, the bias member locating notch 258 is sized so as to limit the amount of compression of the bias member 218. In the illustrative embodiment of FIG. 5, the sleeve body 250 may engage the outer vane mount 230 to limit the compression of the bias member 218. In the illustrative embodiment of FIG. 6, the lip edges 265 formed in the second load-transfer tab 264 may engage the outer surface 246 of the outer vane mount 230 upon compression of the bias member 218 to limit the compression of the bias member 218.

In the illustrative embodiment, the bias member 218 is a wave spring. In other embodiments, the bias member may be a compliant layer, a spring, or another suitable biasing element. In other embodiments, the airfoil assembly 210 may include a plurality of bias members 216 spaced apart along the perimeter of the pressure side 242 of the vane 212.

Figure 7:
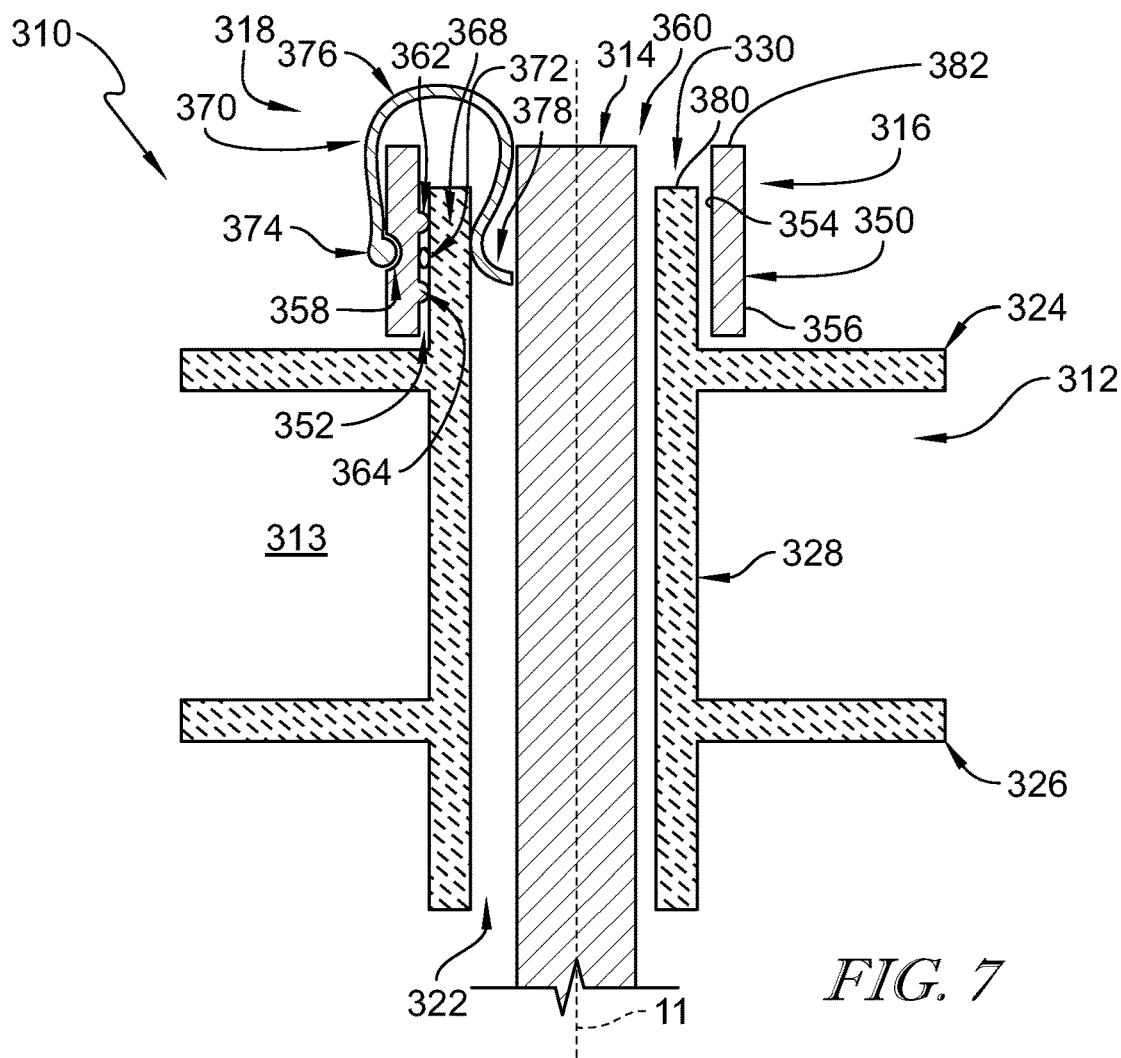
FIG. 7 is a cross-sectional view of another embodiment of the airfoil assembly of FIG. 1 showing the airfoil assembly includes a ceramic matrix composite vane, a metallic support spar that that extends axially through the vane, a metallic sleeve configured to receive force loads applied to the vane by the hot gases during use of the airfoil assembly, and a clip configured to urge the metallic sleeve and a portion of the vane toward each other.
Figure 8:
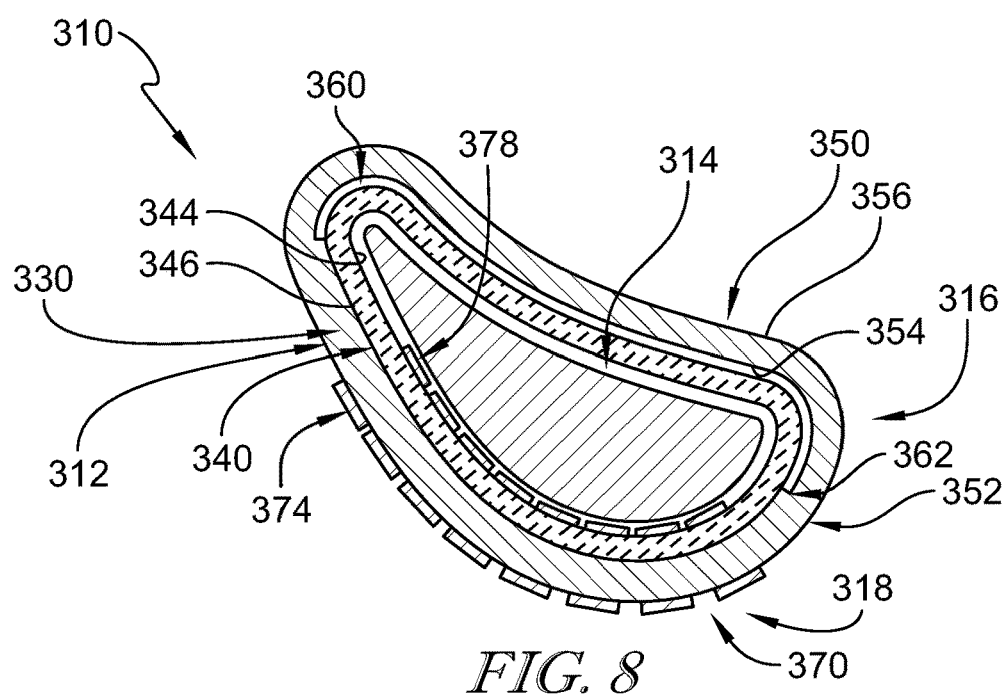
FIG. 8 is a cross-sectional view of the airfoil assembly of FIG. 7 showing the airfoil assembly includes a plurality of clips arranged along the suction side of the vane and the sleeve to bias the load-transfer tabs of the sleeve into engagement with the suction side of the vane.

Another embodiment of an airfoil assembly 310 in accordance with the present disclosure is shown in FIGS. 7 and 8. The airfoil assembly 310 is substantially similar to the airfoil assembly 10 shown in FIGS. 1-4 and described herein. Accordingly, similar reference numbers in the 300 series indicate features that are common between the airfoil assembly 10 and the airfoil assembly 310. The description of the airfoil assembly 10 is incorporated by reference to apply to the airfoil assembly 310, except in instances when it conflicts with the specific description and the drawings of the airfoil assembly 310.

The airfoil assembly 310 includes a ceramic matrix composite vane 312, a metallic support spar 314, a metallic sleeve 316, and a bias member 318 as shown in FIGS. 7 and 8. The ceramic matrix composite vane 312 is adapted to interact with hot gases flowing through a gas path 313 of the gas turbine engine during use of the airfoil assembly 310. The metallic sleeve 316 extends axially through an interior cavity 322 formed in the vane 312 and is configured to receive force loads applied to the ceramic matrix composite vane 312 by the hot gases during use of the airfoil assembly 310. The bias member 318 is configured to urge the metallic sleeve 316 and a portion of the vane 312 toward each other to maintain the transferring of force loads from the vane 312 to the metallic sleeve 316.

The ceramic matrix composite vane 312 includes an outer platform 324, an inner platform 326, an airfoil 328, and an outer vane mount 330 as shown in FIG. 7. The inner platform 326 is spaced apart axially from the outer platform 324 relative to the axis 11. The airfoil 328 extends axially between and interconnects the outer platform 324 and the inner platform 326. The outer vane mount 330 extends axially outward away from the outer platform 324. The metallic sleeve 316 is located axially outward of the outer platform 324 outside of the gas path 313.

The metallic sleeve 316 includes a sleeve body 350 and load-transfer tabs 352 as shown in FIGS. 7 and 8. The sleeve body 350 is arranged around the outer vane mount 330 of the ceramic matrix composite vane 312 and the metallic support spar 314. The load-transfer tabs 352 extend from the sleeve body 350 toward the outer vane mount 330 and engage the outer vane mount 330 to transmit the force loads from the vane 312 to the sleeve 316.

The sleeve body 350 includes an inner sleeve surface 354 and an outer sleeve surface 356 as shown in FIGS. 7 and 8. The inner sleeve surface 354 defines a vane mount cavity 360 that receives a portion of the outer vane mount 330. The outer sleeve surface 356 is opposite the inner sleeve surface 354 and is shaped to define a locating notch 358. The locating notch 358 is configured to locate the bias member 318 and maintain the position of the bias member 318 relative to the vane 312.

The load-transfer tabs 352 include a first load-transfer tab 362 and a second load-transfer tab 364 as shown in FIGS. 7 and 8. The load-transfer tabs 362, 364 extend from the inner sleeve surface 354 and engage an outer surface 346 of the outer vane mount 330. The second load-transfer tab 364 is spaced axially inward from the first load-transfer tab 362 to form a seal channel 368 therebetween. The seal channel 368 is configured to receive a seal element 372 included in the airfoil assembly 310.

In the illustrative embodiment, the load-transfer tabs 352 are continuous rails that extend along and engage a suction side 340 of the vane 312 on the outer vane mount 330. In some embodiments, the load-transfer tabs 352 may be a plurality of tabs 352 that are spaced apart from each other along the suction side 340 of the vane 312. In other embodiments, the load-transfer tabs 352 may be a plurality of tabs 352 that are spaced apart axially along the sleeve body 350.

The bias member 318 includes a clip 370 as shown in FIGS. 7 and 8. The clip 370 receives a portion of the outer vane mount 330 and a portion of the metallic sleeve 316 in the clip 370. In the illustrative embodiments, the clip 370 is located on the suction side 340 of the ceramic matrix composite vane 312 to maintain engagement of the load-transfer tabs 352 on the suction side 340 of the vane 312.

In the illustrative embodiment, the airfoil assembly 310 further includes the seal element 372 as shown in FIG. 7. The seal element 372 is arranged in the seal channel 368 between the load-transfer tabs 362, 364. The seal 372 is configured to seal between the sleeve 316 and the outer vane mount 330 upon unloading of the vane 312 of off-loading of the load-transfer tabs 352.

In the illustrative embodiment, the seal element 372 is a rope seal. In other embodiments, the seal element 372 may be another suitable seal.

The clip 370 includes a locating end 374, a curved biasing portion 376, and a clip head 378 as shown in FIGS. 7 and 8. The locating end 374 is arranged in the locating notch 358 formed in the outer sleeve surface 356 of the sleeve body 350. The curved biasing portion 376 extends from the locating end 374 and around the sleeve body 350 and outer vane mount 330 into the interior cavity 322. The clip head 378 extends from the curved biasing portion 376 and engages an inner surface 344 of the outer vane mount 330 that defines the interior cavity 322. The curved biasing portion 376 is configured to maintain engagement of the clip head 378 with the inner surface 344 of the outer vane mount 330.

In the illustrative embodiment, the clip 370 receives an axial terminating end 380 of the outer vane mount 330 and an axial terminating end 382 of the sleeve body 350 as shown in FIG. 7. The axial terminating ends 380, 382 are spaced axially outward from the outer platform 324 of the vane 312. In the illustrative embodiment, the curved biasing portion 376 extends around the axial terminating ends 380, 382 of the outer vane mount 330 and the sleeve body 350.

In the illustrative embodiment, the airfoil assembly 310 includes a plurality of clips 370 as shown in FIG. 8. Each of the clips 370 are spaced along the suction side 340 of the vane 312. In other embodiments, the bias member 318 may be a single clip 370 that extends along the suction side 340 of the vane 312.

In some embodiments, the airfoil assembly 310 may include a single clip 370 with a locating end 374 and a plurality of clip heads 376, 378. The locating end 374 may extend along the suction side 340 of the vane 312 and the plurality of clip heads 376, 378 may be spaced apart along the suction side 340 of the vane 312 and each extend from the locating end 474 around a portion of the vane 312.

In some embodiments, the support spar 314 may couple with the outer mount support to couple the support spar 314 to the case 19. The outer mount support may include a wall located radially outward of the clip 370. The wall, along with the notch 358, may help locate the clip 370. In some embodiments, the wall may be configured to maintain the engagement of the clip 370 with the vane 312 and the support spar 314 by blocking the clip 370 from backing off the components during operation of the engine.

Figure 9:
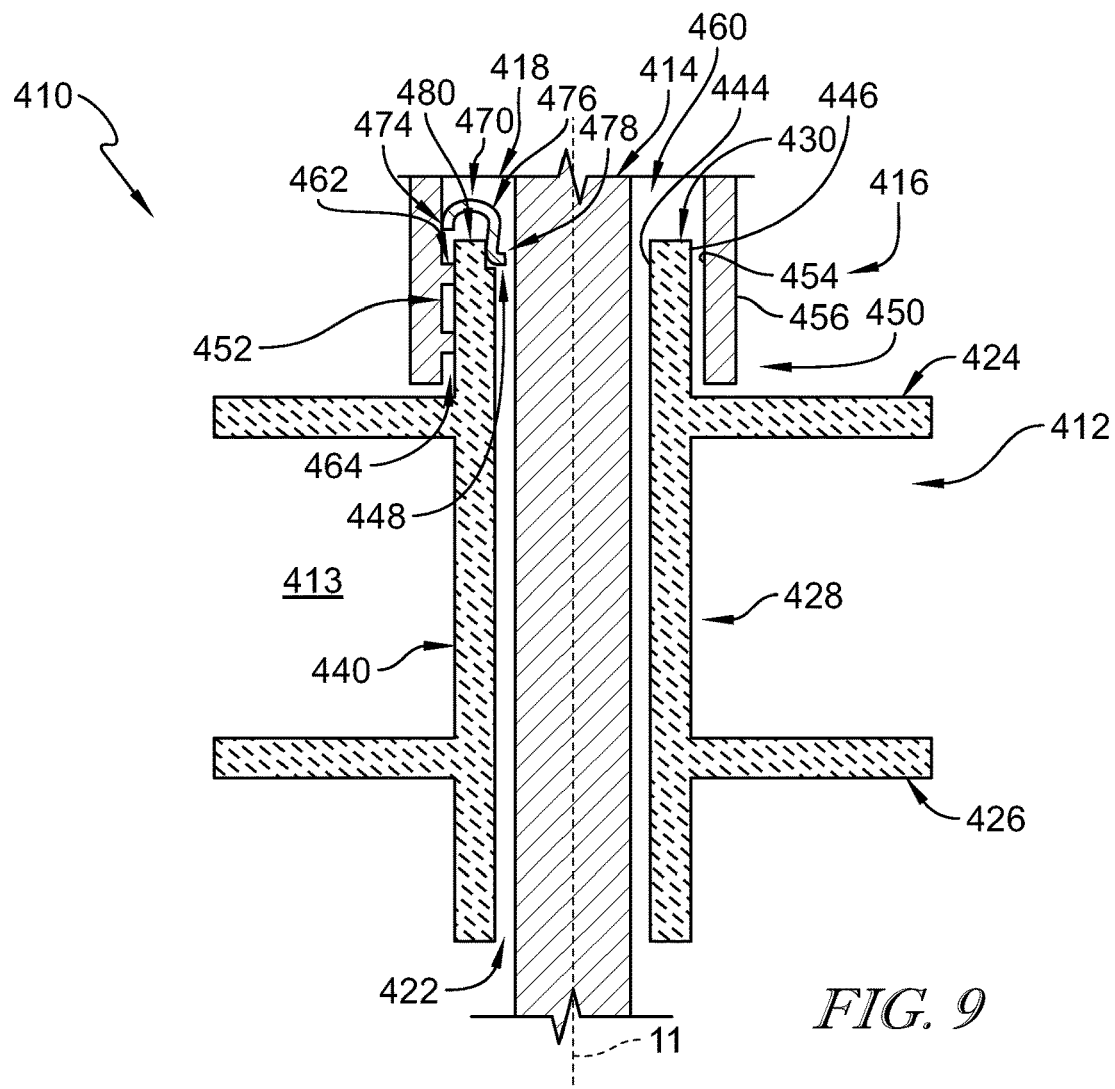
FIG. 9 is cross-sectional view of another embodiment of the airfoil assembly of FIG. 1 showing the airfoil assembly includes a ceramic matrix composite vane, a metallic support spar that that extends axially through the vane, a metallic sleeve configured to receive force loads applied to the vane by the hot gases during use of the airfoil assembly, and a clip fixed to the sleeve and configured to urge the sleeve and a portion of the vane toward each other.
Figure 10:
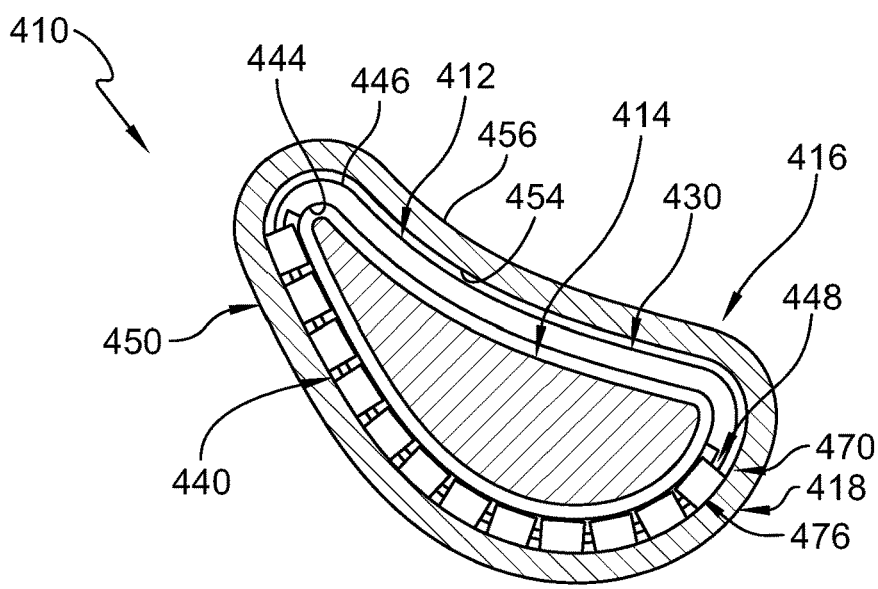
FIG. 10 is a top view of the airfoil assembly of FIG. 9 showing the sleeve includes a sleeve body that extends around the vane and load-transfer tabs that engage with the suction side of the vane, and further showing the airfoil assembly includes a plurality of clips arranged along the suction side of the vane and the sleeve to bias the load-transfer tabs of the sleeve into engagement with the suction side of the vane.

Another embodiment of an airfoil assembly 410 in accordance with the present disclosure is shown in FIGS. 9 and 10. The airfoil assembly 410 is substantially similar to the airfoil assembly 10 shown in FIGS. 1-4 and described herein. Accordingly, similar reference numbers in the 400 series indicate features that are common between the airfoil assembly 10 and the airfoil assembly 410. The description of the airfoil assembly 10 is incorporated by reference to apply to the airfoil assembly 410, except in instances when it conflicts with the specific description and the drawings of the airfoil assembly 410.

The airfoil assembly 410 includes a ceramic matrix composite vane 412, a metallic support spar 414, a metallic sleeve 416, and a bias member 418 as shown in FIGS. 9 and 10. The ceramic matrix composite vane 412 is adapted to interact with hot gases flowing through a gas path 413 of the gas turbine engine during use of the airfoil assembly 410. The metallic sleeve 416 is configured to receive force loads applied to the ceramic matrix composite vane 412 by the hot gases during use of the airfoil assembly 410. The bias member 418 is configured to urge the metallic sleeve 416 and a portion of the vane 412 toward each other to maintain the transferring of force loads from the vane 412 to the metallic sleeve 416.

The ceramic matrix composite vane 412 includes an outer platform 424, an inner platform 426, an airfoil 428, and an outer vane mount 430 as shown in FIG. 9. The inner platform 426 is spaced apart axially from the outer platform 424 relative to the axis 11. The airfoil 428 extends axially between and interconnects the outer platform 424 and the inner platform 426. The outer vane mount 430 extends axially outward away from the outer platform 424.

The outer vane mount 430 includes an inner surface 444, an outer surface 446, and a bias member locating notch 448 as shown in FIGS. 9 and 10. The inner surface 444 defines a portion of the interior cavity 422. The outer surface 446 is opposite the inner surface 444 and the sleeve 416 engages with the outer surface 446 of the outer vane mount 430. The locating notch 448 extends into the inner surface 444 at an axial terminating end 480 of the outer vane mount 330 spaced axially outward from the outer platform 424. In the illustrative embodiment, the bias member 418 extends from the metallic sleeve 416 and engages the outer vane mount 430 at the locating notch 448.

The metallic sleeve 416 includes a sleeve body 450 and load-transfer tabs 462, 464 as shown in FIGS. 9 and 10. The sleeve body 450 is arranged around the outer vane mount 430 of the ceramic matrix composite vane 412 and the metallic support spar 414. The load-transfer tabs 462, 464 extend from the sleeve body 450 toward the outer vane mount 430 and engages the outer vane mount 430 to transmit the force loads from the ceramic matrix composite vane 412 to the metallic sleeve 416.

The sleeve body 450 includes an inner sleeve surface 454 and an outer sleeve surface 456 as shown in FIGS. 9 and 10. The inner sleeve surface 454 defines a vane mount cavity 460 that receives a portion of the outer vane mount 430. The outer sleeve surface 456 is opposite the inner sleeve surface 454. The bias member 418 extends from the inner sleeve surface 454 and engages the locating notch 448 formed in the outer vane mount 430 of the vane 412. In the illustrative embodiment, the bias member 418 is fixed to the inner sleeve surface 454 of the sleeve body 450 and extends to the outer vane mount 430.

The load-transfer tabs 462, 464 include a first load-transfer tab 462 and a second load-transfer tab 464 as shown in FIGS. 9 and 10. The load-transfer tabs 462, 464 extend from the inner sleeve surface 454 and engage the outer surface 446 of the outer vane mount 430. The second load-transfer tab 464 is spaced axially inward from the first load-transfer tab 462.

The bias member 418 includes a clip 470 as shown in FIGS. 9 and 10. The clip 470 extends from the inner sleeve surface 454 of the sleeve body 450 axially outward of the load-transfer tabs 462, 464. The clip 470 is fixed with the metallic sleeve 416 on the suction side 440 of the metallic sleeve 416. The clip 470 extends from the inner sleeve surface 454 of the sleeve body 450 and receives the axial terminating end 480 of the outer vane mount 430.

In the illustrative embodiment, the load-transfer tabs 462, 464 extend along and engage the suction side 440 of the outer vane mount 430. The clip 470 is located on the suction side 440 of the ceramic matrix composite vane 412 to maintain engagement of the load-transfer tabs 462, 464 on the suction side 440 of the vane 412.

The clip 470 includes a locating end 474, a curved biasing portion 476, and a clip head 478 as shown in FIG. 7. The locating end 474 is fixed to the inner sleeve surface 454 of the sleeve body 450. The curved biasing portion 476 extends from the locating end 474 and around the axial terminating end 480 of the outer vane mount 430. The clip head 478 extends from the curved biasing portion 476 and engages the locating notch 448 of the outer vane mount 430. The curved biasing portion 476 is configured to maintain engagement of the clip head 478 with locating notch 448 of the outer vane mount 430.

In the illustrative embodiment, the locating end 474 is brazed or welded to the inner sleeve surface 454 of the sleeve body 50. In other embodiments, the locating end 474 may be attached using another suitable method.

In the illustrative embodiment, the airfoil assembly 410 includes a plurality of bias members 418 or clips 470 as shown in FIG. 10. Each of the clips 470 are spaced along the suction side 40 of the vane 12. In other embodiments, the clip 470 may be a single clip 470 that extends along the suction side 40 of the vane 12.

In some embodiments, the airfoil assembly 410 may include a single clip 470 with a locating end 474 and a plurality of clip heads 476, 478. The locating end 474 may extend along the suction side 440 of the vane 412 and the plurality of clip heads 476, 478 may be spaced apart along the suction side 440 of the vane 412 and each extend from the locating end 474 around a portion of the vane 412.

Figure 11:
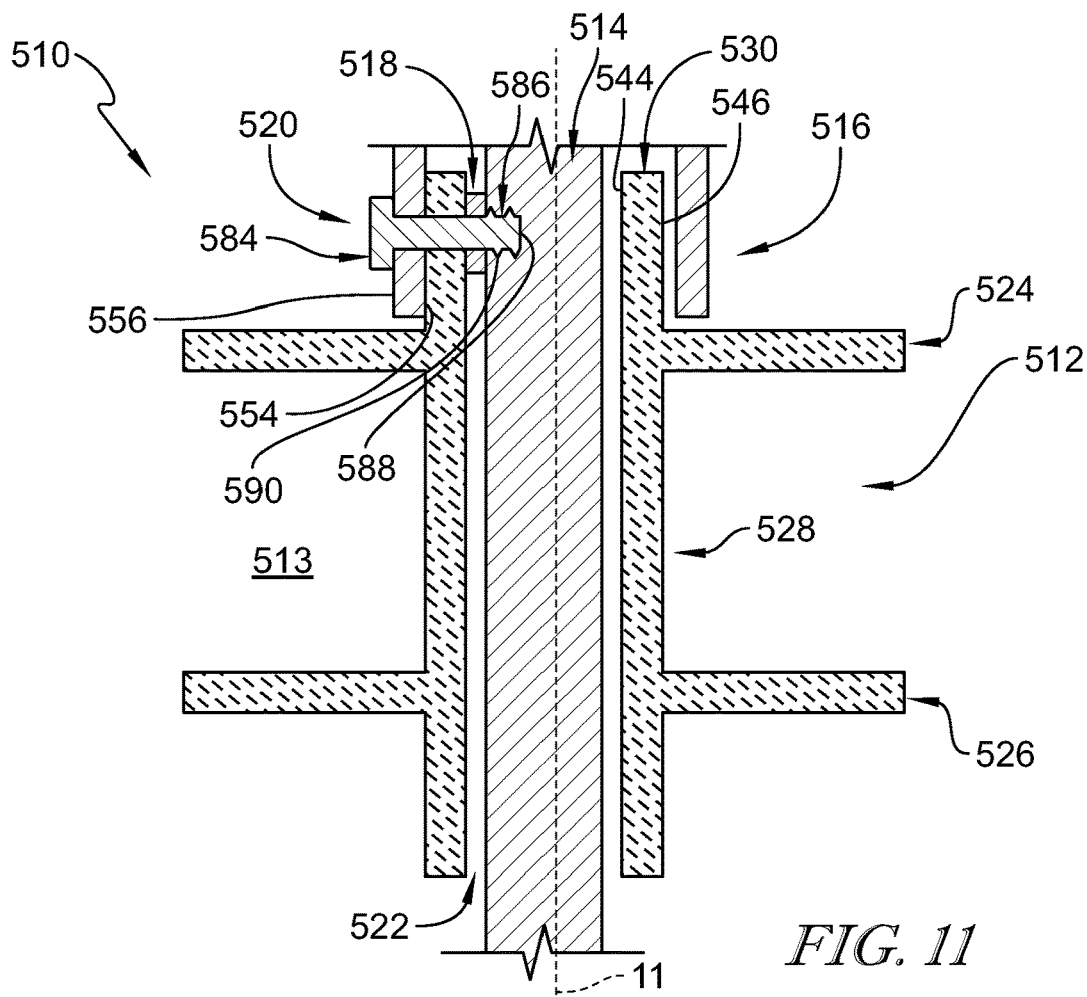
FIG. 11 is cross-sectional view of another embodiment of the airfoil assembly of FIG. 1 showing the airfoil assembly includes a ceramic matrix composite vane, a metallic support spar that that extends axially through the vane, a metallic sleeve configured to receive force loads applied to the vane by the hot gases during use of the airfoil assembly, and a fastener that extends through the portion of the vane, support spar, and sleeve to maintain engagement of the sleeve with the vane.
Figure 12:
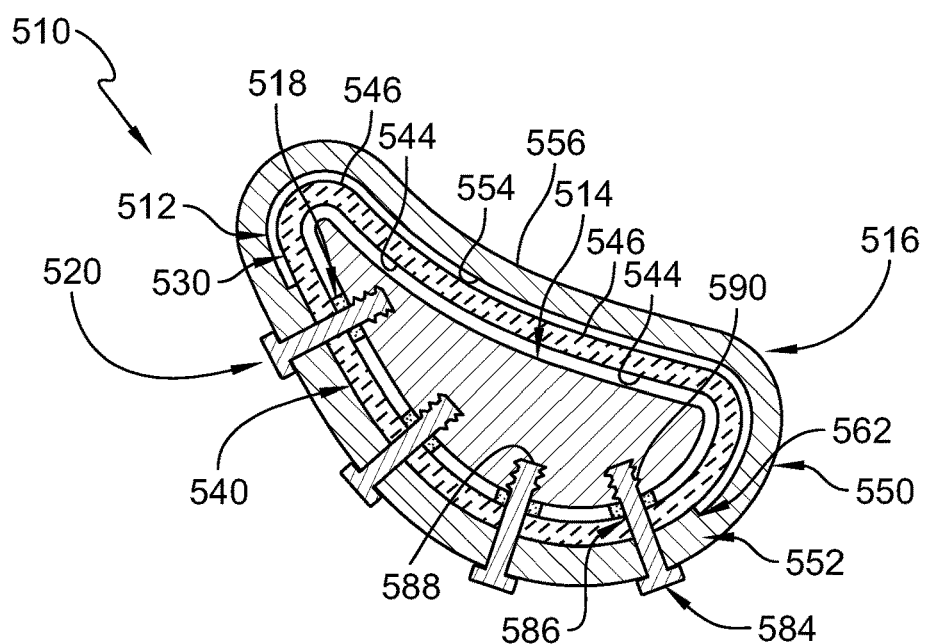
FIG. 12 is a cross-sectional view of the airfoil assembly of FIG. 11 showing the sleeve includes a sleeve body that extends around the vane, and showing that the fastener extends through the sleeve body and the vane into the support spar on the suction side of the vane.

Another embodiment of an airfoil assembly 510 in accordance with the present disclosure is shown in FIGS. 11 and 12. The airfoil assembly 510 is substantially similar to the airfoil assembly 10 shown in FIGS. 1-4 and described herein. Accordingly, similar reference numbers in the 500 series indicate features that are common between the airfoil assembly 10 and the airfoil assembly 510. The description of the airfoil assembly 10 is incorporated by reference to apply to the airfoil assembly 510, except in instances when it conflicts with the specific description and the drawings of the airfoil assembly 510.

The airfoil assembly 510 includes a ceramic matrix composite vane 512, a metallic support spar 514, a metallic sleeve 516, a bias member 518, and a fastener 520 as shown in FIGS. 11 and 12. The ceramic matrix composite vane 512 is adapted to interact with hot gases flowing through a gas path 513 of the gas turbine engine during use of the airfoil assembly 510. The metallic sleeve 516 is configured to receive force loads applied to the ceramic matrix composite vane 512 by the hot gases during use of the airfoil assembly 510. The bias member 518 is configured to urge the metallic sleeve 516 and a portion of the vane 512 toward each other to maintain the transferring of force loads from the vane 512 to the metallic sleeve 516. The fastener 520 extend into a portion of the vane 512, the sleeve 516, and the support spar 514 to engage the vane 512 with the sleeve 516.

The ceramic matrix composite vane 512 includes an outer platform 524, an inner platform 526, an airfoil 528, and an outer vane mount 530 as shown in FIG. 11. The inner platform 526 is spaced apart axially from the outer platform 524 relative to an axis 511 to define outer and inner boundaries of the gas path 513. The airfoil 528 extends axially between and interconnects the outer platform 524 and the inner platform 526. The outer vane mount 530 extends axially outward away from the outer platform 524.

The outer vane mount 530 includes an inner surface 544 and an outer surface 546 as shown in FIGS. 11 and 12. The inner surface 544 defines a portion of the interior cavity 522. The outer surface 546 is opposite the inner surface 544 and the sleeve 516 engages with the outer surface 546 of the outer vane mount 530.

The metallic sleeve 516 includes a sleeve body 550 and a load-transfer tab 552 as shown in FIGS. 11 and 12. The sleeve body 550 is arranged around the outer vane mount 530 of the vane 512 and the support spar 514. The load-transfer tab 552 extends from the sleeve body 550 toward the outer vane mount 530 and engages the outer vane mount 530 to transmit the force loads from the ceramic matrix composite vane 512 to the metallic sleeve 516.

In the illustrative embodiment, the bias member 518 is located in a portion of the interior cavity 522 defined by the outer vane mount 530 as shown in FIGS. 11 and 12. The bias member 518 is arranged between the inner surface 544 of the outer vane mount 530 and the support spar 514 to urge the outer vane mount 530 and the load-transfer tab 552 of the sleeve 516 into engagement with each other. The bias member 518 is configured to seat the vane 512 against the load-transfer tab 552 on the sleeve 516 under all conditions. The bias member 518 is also configured to set the compression of the components 512, 514, avoiding over compression and stress in the components 512, 514.

In the illustrative embodiment, the bias member 518 is a compliant member 518 as shown in FIGS. 11 and 12. In other embodiments, the bias member 518 may be a shim washer. In other embodiments, the bias member 518 may be other suitable biasing components to urge the outer vane mount 530 and the sleeve 516 towards each other such as a spring.

In other embodiments, the bias member 518 may be made of a material with a higher coefficient of thermal expansion than the fastener 520. By setting the length of the member 518 appropriately, the thermal expansion of the member 518 may be matched by the undergrowth of the ceramic vane 512 such that compression in the bolted joint may be maintained throughout operation. For instance, the member 518 may be made of STELLITE® 31 in such embodiments.

The fastener 520 includes a head 584 and a pin 586 as shown in FIGS. 11 and 12. The head 584 is arranged along an outer sleeve surface 556 of the sleeve body 550. The pin 586 extends from the head 584 through the sleeve 516, the outer vane mount 530, and the bias member 518 into the support spar 514. In the illustrative embodiment, a terminating end 588 of the pin 586 that extends into the support spar 514 is threaded 590 and retains the fastener 520 in place relative to the other components 512, 514, 516.

In the illustrative embodiment, the head 584 of the fastener 520 is a bolt head 584 as shown in FIGS. 11 and 12. In other embodiments, the head 584 of the fastener 520 may be a nut. In other embodiments, the head 584 of the fastener 520 may be a retaining ring with a washer. In other embodiments, the head 584 of the fastener 520 may be another suitable retention element such as a cotter key or integral features that would resist movement of the fastener 520 relative to the other components 512, 514, 516.

In some embodiments, the support spar 514 may be hollow and the pin 586 of the fastener 520 may extend through a hole formed in the support spar 514 into the hollow cavity extending axially through the support spar 514. The pin 586 may be retained to the support spar 514 by a retaining ring, cotter key, or another suitable retaining device attached to the end of the pin 586 extending through the hole. In other embodiments, the fastener 520 may only include the pin 586 having threads 590 at both ends that mate with corresponding threads in the metallic sleeve 516 and the metallic support spar 514.

The present disclosure relates to load transferring of an airfoil assembly 10, 210, 310, 410, 510 within a gas turbine engine. Specifically, the present disclosure teaches transferring loads from a ceramic matrix composite (CMC) turbine vane 12, 212, 312, 412, 512 to a metallic support structure 14, 214, 314, 414, 514.

As there may be a significant difference in the coefficient of thermal expansion between ceramic matrix composite materials and high temperature metals, the metallic support spar 14, 214, 314, 414, 514 may outgrow or expand more than the ceramic matrix composite vane 12, 212, 312, 412, 512. This difference in thermal expansion may not allow for clamping arrangements of the airfoil assembly 10, 210, 310, 410, 510.

Due to the low strength capability of the ceramic matrix composite materials, applying significant pre-load to the ceramic matrix composite materials of the airfoil assembly 10, 210, 310, 410, 510 may be difficult. The low strength capability and the relatively high stiffness of the ceramic matrix composite materials may also make transferring loading of the vane 12, 212, 312, 412, 512 difficult. For instance, typical load-transfer features may not be able to conform to the ceramic matrix composite airfoil shape and offer distributed loading.

As a solution, the present disclosure teaches discrete load-transfer features or load-transfer tabs 52, 252, 352, 462, 464, 552 on a metallic sleeve 16, 216, 316, 416, 516 as shown in FIGS. 2-12. The load-transfer features 52, 252, 352, 462, 464, 552 offer a determinant load-transferring system and control the orientation of the ceramic matrix composite vane 12, 212, 312, 412, 512. These aspects may affect the turbine capacity or the throat area between adjacent vanes 12, 212, 312, 412, 512. Therefore, the load-transfer arrangement of the present disclosure may help increase engine efficiency.

An embodiment of the airfoil assembly 10 is shown in FIGS. 1-3. The airfoil assembly 10 includes a ceramic matrix composite vane 12 with ceramic matrix composite platform protrusions 24, 26 to incorporate the load-transfer features 52 outside of the hot gas path region 13. The airfoil assembly 10 also includes a metallic sleeve 16 having three features 62, 64, 66 to address the vane support requirements across the operating range.

In the illustrative embodiment, the load-transfer tabs 52 are a hard-stop, pad, or datum 62, 64, 66. The datums 62, 64, 66 locate the ceramic matrix composite component 12 and transmit the aerodynamic forces. In the illustrative embodiment, the load-transfer tabs 62, 66 are arranged on the suction side 40 of the vane 12, while the other load-transfer tab 64 is arranged on the pressure side 42 of the vane 12. The load-transfer tab 64 is located on the pressure side 42 of the vane 12 acts as a retention feature 64 to prevent gross movement of the ceramic matrix composite component 12 during off-design conditions and to limit movement of the vane 12 during surge event.

In the illustrative embodiment of FIGS. 4-6, the airfoil assembly 210 further includes a pre-load feature or bias member 218. The bias member 218 is configured to ensure that the ceramic matrix composite component 212 is correctly located onto the load-transfer features 52.

The load-transfer features 52, 252, 352, 462, 464, 552 may also be configured to engage the vane 12, 212, 312, 412, 512 across a typical flight cycle so that the orientation of the aerodynamic load applied to a vane 12, 212, 312, 412, 512 does not dramatically change. As such, under load the ceramic matrix composite vane 12, 212, 312, 412, 512 may be biased towards the load-transfer features 52, 252, 352, 462, 464, 552 in a similar direction but with varying magnitude.

Under extreme operating conditions, such as engine surge, the orientation of the aerodynamic load may shift. At engine shutdown or when the vane 12, 212, 312, 412, 512 is un-loaded, the ceramic matrix composite vane 12, 212, 312, 412, 512 may then be unsupported and due to the circumferential distribution of the components around the engine. All parts may likely unload in different directions and with varying magnitudes.

To prevent unloading, the ceramic matrix composite vane 212, 312, 412, 512 may be biased towards the datum features 262, 264, 362, 364, 462, 464 such that the ceramic matrix composite vane 212, 312, 412, 512 retain position when the vane 212, 312, 412, 512 is unloaded. The magnitude of this pre-load may be greater than the inertia of the ceramic matrix composite vane 212, 312, 412, 512 under typical engine-unpowered vibration, airframe operating loads, and/or landing loads. The pre-load may be no greater than this value as it must be in the direction of the aerodynamic load and may add to that load vector. In the illustrative embodiments, the airfoil assemblies 210, 310, 410 510 each include load-transfer features and variations of the pre-load feature.

In the illustrative embodiment of FIGS. 1-3, the airfoil assembly 10 includes the metallic sleeve 16 that creates the load-transfer tabs 52 that contact on the external or outer surface 46 of the ceramic matrix composite vane 12. In other embodiments, the load-transfer tabs 52 may contact the internal or inner surface 44 of the ceramic matrix composite vane 12.

However, there may be some advantages to arranging the load pads 62, 64, 66 on the outer surface 46 of the vane 12. Arranging the load pads 62, 64, 66 on the outer surface 46 of the vane 12 may alleviate concerns of greater thermal growth of the metallic sleeve 16, which may cause tensile hoop stresses in the ceramic matrix composite vane 12. Additionally, arranging the load pads 62, 64, 66 on the outer surface 46 of the vane 12 may allow all internal vane cavity space 22 to be utilized by the support spar 14, thus producing a stiffer structure for supporting the inter stage seal load from the inner stage seal.

In the illustrative embodiments, the bias member 218, 318, 418, 518 may be configured to bias the load pads 252, 352, 462, 464, 552 and the outer vane mount 230, 330, 430, 530 of the vane 212, 312, 412, 512 toward each other at cold conditions, but also configured to minimize the load at high temperatures. Minimizing the bias force or pre-load at high temperatures may reduce the stress in the vane 212, 312, 412, 512. Biasing the load pads 252, 352, 462, 464, 552 may also improve the creep performance of the airfoil assembly 210, 310, 410, 510, as the creep rate may be proportional to the load/stress within the part and hence, should reduce with temperature.

In the illustrative embodiments, positioning the bias member 218, 318, 418, 518 outboard of the hot gas path region 13 may reduce the temperature of the bias member 218, 318, 418, 518 so as to avoid excessive creep and stress relaxation. Additionally, locating the bias member 218, 318, 418, 518 outside the gas path 13 may allow for cooling the features as necessary.

Also, the high level of thermal radiation within the inside of the ceramic matrix composite vane 12, 212, 312, 412, 512 in the hot gas path region 13, along with the minimal space, may limit the ability to apply cooling or apply heat shielding to the features. However, outside of the gas path 13, the amount of available space to apply cooling air or heat shield may be greater. In addition, the radiation loading of heat onto the features may be drastically lower outside of the gas path 13.

In the illustrative embodiment of FIGS. 4-6, the load-transfer tab 264 is shaped to include a locating notch 258 or lips 265 around the bias member 218 to limit the amount of compression possible on the bias member 218. These lips 265 may also be configured to contain the bias member 218 in the proper location.

In the illustrative embodiment of FIGS. 7 and 8, the bias member 318 includes sprung metallic clips 370 to couple the ceramic matrix composite vane 312 to a metallic sleeve 316. The clips 370 may be discreet sections as shown in FIG. 8. In other embodiments, the clips 370 may be a singular clip 370 as needed.

The clips 370 may be retained by spring forces encouraging interference features into receiving features on the metallic sleeve 316. In the illustrative embodiment of FIG. 7, the clip 370 includes a locating end 374 that mates with the locating notch 366 formed in the support spar 314. In the illustrative embodiment of FIG. 9, the clip 470 includes a clip head 478 that mates with the locating notch 448 formed in the vane 412. Such interference and receiving features may be advantageous as it may allow tolerance of manufacturing variability and thermal mismatch.

In the illustrative embodiment, the airfoil assembly 310 may further include a seal element 372 as shown in FIGS. 7 and 8. The seal element 372 may be a rope seal, between the ceramic matrix composite vane 312 and the metallic sleeve 316. The metallic sleeve 316 may contact the ceramic matrix composite vane 312 via discreet contact features 362, 364.

In the illustrative embodiment, the load-transfer tabs 362, 364 may be continuous rails oriented substantially in the perimeter direction as oriented to the ceramic matrix composite attachment feature or outer vane mount 330. In other embodiments, the tabs 362, 364 may be discontinuous bumps/protrusions.

In the illustrative embodiment of FIGS. 9 and 10, the airfoil assembly 410 may include clips 470 made out of thin high temperature nickel alloy stock and permanently fixed (i.e. welded, brazed, etc.). In other embodiments, the clips 470 may be a removable assembly to the metallic sleeve 416. In some embodiments, a simple clip 470 formed of sheet stock as a permanent assembly to the metallic sleeve 416 may minimize the cost and the permanent assembly process.

In the illustrative embodiment of FIGS. 11 and 12, the airfoil assembly includes load pads 552, a post or fastener 520, and a bias member or resilient component 518. The load pads 552 may be formed on either of the inner or outer sleeve surfaces 554, 556 and contact the corresponding surface of the outer vane mount 530.

The fastener 520 may be assembled through a hole in the ceramic matrix composite vane 512 and attached to the metallic support spar 514. This fastener 520 may be threaded 590 on one or both ends 588 and may pass through a hole in the metallic support spar 514. The fastener 520 may be blocked from removal from the hole by a retaining ring, cotter key, or other such retaining device.

The bias member or resilient component 518 may be located between the outer surface 546 of the ceramic matrix composite vane 512 and the end 588 of the fastener 520. In some embodiments, the resilient layer 518 may be a high temperature nickel alloy Belleville washer, a high temperature nickel alloy wave washer, or a high temperature gasket material such as THERMICULITE® or mica board (metal foil encapsulated or not).

In the illustrative embodiment, a feature 584 at the external end of the fastener 520 may be fixed to the pin 586 and may compress and contain the resilient component 518. This feature 584 may be a head 584 on the pin 586 (similar to a bolt head), a nut, or a separate washer type piece with a slip fit over the pin 586. If a separate washer is utilized, a retention feature such as a retaining ring, cotter key, or integral features may be used allow pressed assembly, but also resist movement in the opposite direction. If a washer and retaining ring type retention is utilized, a shim washer(s) may be used to set the compression of the resilient component 518.

An optional feature may be a spacer. The spacer may allow the bias member 518 to be compressed only to a height set by the spacer. Such a spacer may be a separate piece or integral with the spring retention piece 518 or integral with the outer vane mount 530 of the ceramic matrix composite component 512.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly for a gas turbine engine, the airfoil assembly comprising
a ceramic matrix composite vane adapted to interact with hot gases flowing through a gas path of the gas turbine engine during use of the airfoil assembly, the ceramic matrix composite vane including an outer platform that defines an outer boundary of the gas path, an inner platform spaced apart axially from the outer platform relative to an axis to define an inner boundary of the gas path, an airfoil that extends axially between and interconnects the outer platform and the inner platform, and an outer vane mount that extends axially outward away from the outer platform, wherein the outer vane mount of the ceramic matrix composite vane is airfoil shaped and includes a leading edge, a trailing edge, a pressure side, and a suction side,
a metallic support spar that extends axially through an interior cavity formed in the ceramic matrix composite vane, and
a metallic sleeve configured to receive force loads applied to the ceramic matrix composite vane by the hot gases during use of the airfoil assembly, the metallic sleeve located axially outward of the outer platform outside of the gas path, and wherein the metallic sleeve includes a sleeve body arranged around the leading edge, the trailing edge, the pressure side, and the suction side of the outer vane mount of the ceramic matrix composite vane and the metallic support spar and a first load-transfer tab that extends axially away from the sleeve body toward the outer vane mount of the ceramic matrix composite vane and engages the outer vane mount on at least one of the pressure side and suction side of the outer vane mount to transmit the force loads from the ceramic matrix composite vane to the metallic sleeve.

2. The airfoil assembly of claim 1, wherein the outer vane mount includes an inner surface that defines a portion of the interior cavity and an outer surface opposite the inner surface and the first load-transfer tab is engaged with the outer surface of the outer vane mount.

3. The airfoil assembly of claim 2, wherein the first load-transfer tab is engaged with the outer surface of the outer vane mount on the suction side of the ceramic matrix composite vane.

4. The airfoil assembly of claim 3, wherein the metallic sleeve further includes a second load-transfer tab configured to engage the outer surface of the outer vane mount on the pressure side of the outer vane mount.

5. The airfoil assembly of claim 1, wherein the airfoil assembly further comprises a bias member configured to urge the outer vane mount and the metallic sleeve toward each other on the suction side of the outer vane mount.

6. The airfoil assembly of claim 5, the bias member is located in a locating notch between the outer vane mount and the metallic sleeve on the pressure side of the outer vane mount.

7. The airfoil assembly of claim 4, wherein the metallic sleeve further includes a third load-transfer tab configured to engage the outer surface of the outer vane mount on the suction side of the outer vane mount.

8. The airfoil assembly of claim 5, wherein the bias member is located between the outer vane mount and the sleeve on only the pressure side of the outer vane mount.

9. The airfoil assembly of claim 8, wherein the sleeve includes an inner sleeve surface that defines a vane mount cavity that receives the outer vane mount and an outer sleeve surface opposite the inner sleeve surface, the inner sleeve surface is shaped to include a locating notch that extends into the inner sleeve surface and opens toward the pressure side of the outer vane mount, and the bias member is located in the locating notch.

10. The airfoil assembly of claim 8, wherein the metallic sleeve further includes a second load-transfer tab configured to engage the outer vane mount on the pressure side of the outer vane mount and the bias member is located between the second load-transfer tab of the sleeve and the outer vane mount.

11. The airfoil assembly of claim 10, wherein the second load-transfer tab is shaped to include a locating notch that extends into the second load-transfer tab and opens toward the pressure side of the outer vane mount and the bias member is located in the locating notch.

12. The airfoil assembly of claim 10, wherein the locating notch is sized so as to limit the amount of compression of the bias member.

13. An airfoil assembly comprising
a vane including an outer platform, an inner platform spaced apart axially from the outer platform relative to an axis, an airfoil that extends axially between and interconnects the outer platform and the inner platform, and an outer vane mount that extends axially outward away from the outer platform, wherein the outer vane mount of the ceramic matrix composite vane is shaped to define a leading edge, a trailing edge, a pressure side, and a suction side, a sleeve that includes a sleeve body arranged around the leading edge, the trailing edge, the pressure side, and the suction side of the outer vane mount of the vane and a load-transfer tab that engages the outer vane mount, and a bias member located between the outer vane mount and the sleeve on only the pressure side of the outer vane mount and configured to urge the outer vane mount and the sleeve toward each other.

14. The airfoil assembly of claim 13, wherein the sleeve includes an inner sleeve surface that defines a vane mount cavity that receives the outer vane mount and an outer sleeve surface opposite the inner sleeve surface, the inner sleeve surface is shaped to include a locating notch that extends into the inner sleeve surface and opens toward the pressure side of the outer vane mount, and the bias member is located in the locating notch.

15. The airfoil assembly of claim 13, wherein the outer vane mount includes an inner surface that defines a portion of an interior cavity that extends axially into the vane and an outer surface opposite the inner surface and the load-transfer tab is engaged with the outer surface of the outer vane mount.

16. The airfoil assembly of claim 13, wherein the load-transfer tab is engaged with the outer vane mount on the suction side of the vane.

17. A method comprising, providing a vane and a sleeve, the vane including an outer platform, an inner platform spaced apart axially from the outer platform relative to an axis, an airfoil that extends axially between and interconnects the outer platform and the inner platform, and an outer vane mount having an airfoil shape that extends axially outward away from the outer platform and includes a leading edge, a trailing edge, a pressure side, and a suction side, and the sleeve includes a sleeve body and a load-transfer tab that extends axially away from the sleeve body, arranging the sleeve around the leading edge, the trailing edge, the pressure side, and the suction side of the outer vane mount to locate the sleeve axially outward of the outer platform, and engaging the outer vane mount with the load-transfer tab of the sleeve.

18. The method of claim 17, wherein the load-transfer tab is located on the suction side of the outer vane mount and the method further comprises biasing the outer vane mount and the load-transfer tab toward one another.

19. The method of claim 17, wherein the engaging the outer vane mount with the load transfer tab includes engaging the load-transfer tab on only a suction side of the outer vane mount.

20. The method of claim 19, further comprising providing a bias member and locating the bias member between the outer vane mount and the sleeve on only the pressure side of the outer vane mount to bias the outer vane mount and the load-transfer tab toward one another.

* * * * *